(12) United States Patent
Chen et al.

(10) Patent No.: US 11,364,585 B2
(45) Date of Patent: Jun. 21, 2022

(54) ELECTRIC TOOL

(71) Applicant: Nanjing Chervon Industry Co., Ltd., Nanjing (CN)

(72) Inventors: Zhiguo Chen, Nanjing (CN); Yanxiao Shao, Nanjing (CN)

(73) Assignee: Nanjing Chervon Industry Co., Ltd., Nanjing (CN)

(*) Notice: Subject to any disclaimer, the term of this patent is extended or adjusted under 35 U.S.C. 154(b) by 0 days.

(21) Appl. No.: 17/096,430

(22) Filed: Nov. 12, 2020

(65) Prior Publication Data
US 2021/0213579 A1 Jul. 15, 2021

(30) Foreign Application Priority Data

Jan. 9, 2020 (CN) .......................... 202010021059.4
May 27, 2020 (CN) .......................... 202010460056.0

(51) Int. Cl.
*B23Q 11/00* (2006.01)
*B23B 51/04* (2006.01)
*B25F 5/00* (2006.01)

(52) U.S. Cl.
CPC ............ *B23Q 11/005* (2013.01); *B23B 51/04* (2013.01); *B25F 5/008* (2013.01)

(58) Field of Classification Search
CPC ...................................................... B25F 5/008
USPC ........................................ 173/198, 168, 217
See application file for complete search history.

(56) References Cited

U.S. PATENT DOCUMENTS

| 7,398,836 B2* | 7/2008 | Elmvist | ................... B25C 1/047 173/168 |
| 2014/0048301 A1* | 2/2014 | Okouchi | ................... B25F 5/02 173/217 |

* cited by examiner

*Primary Examiner* — Michelle Lopez
(74) *Attorney, Agent, or Firm* — Greenberg Traurig, LLP

(57) ABSTRACT

An electric tool includes a housing, a motor, a power output assembly, and a switching member. The housing is provided with a first air outlet and a second air outlet. The power output assembly is connected to the motor. The switching member is capable of rotating in the housing, and the switching member is provided with a third air outlet and a fourth air outlet. The switching member is capable of rotating to a first position and a second position in the housing. When the switching member rotates to the first position, the first air outlet is in communication with the third air outlet and the fourth air outlet is closed by the housing. When the switching member rotates to the second position, the second air outlet is in communication with the fourth air outlet and the third air outlet is closed by the housing.

18 Claims, 17 Drawing Sheets

ELECTRIC TOOL

RELATED APPLICATION INFORMATION

This application claims the benefit under 35 U.S.C. § 119(a) of Chinese Patent Application No. CN 202010021059.4, filed on Jan. 9, 2020, and Chinese Patent Application No. CN 202010460056.0, filed on May 27, 2020, which applications are incorporated herein by reference in their entirety.

TECHNICAL FIELD

The present disclosure relates to electric tools, in particular to an electric tool capable of opening holes in a wall.

BACKGROUND

Electric tools are important tools for construction and workpiece processing. Electric tools are inseparable for punching or polishing of parts and providing slots or openings in a wall. Dust will be generated during the processing of using the electric tools, so it is necessary to set up a blowing structure at a front end of the electric tools to blow away the dust, avoid a user from contacting with the dust, and improve the safety of using the electric tools. In the electric tools of the prior art, the blowing efficiency of the blowing structure is low, and the dust in all directions cannot be effectively blown away.

In addition, the electric tools usually include a locking member for installing a working attachment. When the user needs to remove or install the working attachment, the user will need to use an auxiliary tool to unlock the locking member, so that the user can remove the working attachment. However, for the existing electric tools, when the user needs to remove or install the working attachment, the user will usually need to find the auxiliary tool from a toolbox or a workbench. However, if the auxiliary tool is in the toolbox and there is not the toolbox around the user, such as when the user is working at height or when the user is working in a field, the user cannot find the suitable auxiliary tool at this time, making it difficult to remove and install the working attachment. Or even if the auxiliary tool is placed on the workbench, it is easy for the user to conveniently place the auxiliary tool in a certain place when using the auxiliary tool, and to forget the placement position of the auxiliary tool when the auxiliary tool is used next time, thereby reducing work efficiency.

SUMMARY

In one example of the disclosure, an electric tool comprises: a housing provided with a first air outlet and a second air outlet; a motor arranged in the housing; a power output assembly connected to the motor; and a switching member capable of rotating in the housing, wherein the switching member is provided with a third air outlet and a fourth air outlet; wherein the switching member is capable of rotating to a first position and a second position in the housing; when the switching member rotates to the first position, the first air outlet is in communication with the third air outlet, and the fourth air outlet is closed by the housing; when the switching member rotates to the second position, the second air outlet is in communication with the fourth air outlet, and the third air outlet is closed by the housing.

In one example, the first air outlet is arranged at an upper end of the housing, and the second air outlet is arranged on a side surface of the housing.

In one example, the switching member comprises an upper wall and a side wall, the third air outlet is arranged on the upper wall of the switching member, and the fourth air outlet is arranged on the side wall of the switching member.

In one example, the housing is provided with a mounting groove for mounting the switching member, the mounting groove comprises an upper side wall, a lower side wall and a bottom wall, the upper side wall contacts with the upper wall of the switching member, the lower side wall abuts against a lower end of the switching member.

In one example, the bottom wall of the mounting groove is provided with flanges and the flanges abut against the side wall of the switching member.

In one example, the number of the flanges is two, and the two flanges lock an airflow from the fourth air outlet in an air duct formed between the two flanges.

In one example, the switching member is provided with a through hole for a rotor of the motor to pass through.

In one example, the switching member is provided with an operating structure for a user to operate to drive the switching member to rotate In one example, the operating structure is a rib integrally formed on the switching member, the housing is provided with a slot-shaped hole for the rib to pass through, and the slot-shaped hole extends along a circumferential direction of the housing, the rib is capable of sliding in the slot-shaped hole along the circumferential direction of the housing.

In one example, the electric tool further comprises a guard, the housing comprises a mounting rib for mounting the guard, and the mounting rib is provided with the first air outlet.

In one example, the motor comprises a motor shaft rotatable about a first axis, and the first air outlet extends along a direction obliquely intersecting the first axis.

In one example, the switching member is arranged at an upper end of the motor.

In one example, when the switching member rotates to the first position, the second air outlet is closed by the switching member; when the switching member rotates to the second position, the first air outlet is closed by the switching member.

In one example of the disclosure, an electric tool comprises: a housing provided with a first air outlet and a second air outlet; a motor arranged in the housing; a power output assembly connected to the motor; and a switching member capable of rotating to a first position and a second position relative to the housing; wherein when the switching member rotates to the first position, the first air outlet guides an airflow to blow to the outside of the housing, and the second air outlet is closed by the switching member; when the switching member rotates to the second position, the second air outlet guides the airflow to blow to the outside of the housing, and the first air outlet is closed.

In one example of the disclosure, a drywall cutting tool comprises: a housing provided with a first air outlet and a second air outlet; a motor arranged in the housing; a power output assembly connected to the motor; and a switching member capable of rotating to a first position and a second position relative to the housing; wherein when the switching member rotates to the first position, the first air outlet guides an airflow to blow to the outside of the housing, and the second air outlet is closed by the switching member; when the switching member rotates to the second position, the second air outlet guides the airflow to blow to the outside of the housing, and the first air outlet is closed.

In one example, the switching member is provided with a third air outlet and a fourth air outlet; when the switching member rotates to the first position, the first air outlet is in communication with the third air outlet, and the fourth air outlet is closed by the housing; when the switching member rotates to the second position, the second air outlet is in communication with the fourth air outlet, and the third air outlet is closed by the housing.

In one example, the first air outlet is arranged at an upper end of the housing, and the second air outlet is arranged on a side surface of the housing.

In one example, first air outlet guides an airflow to a working area on an upper side of the drywall cutting tool, and the second air outlet guides the airflow to the side of the drywall cutting tool.

In one example, the switching member comprises an upper wall and a side wall, the third air outlet is provided on the upper wall of the switching member, and the fourth air outlet is provided on the side wall of the switching member.

In one example, the switching member is arranged at an upper end of the motor.

DETAILED DESCRIPTION

Figure 1:
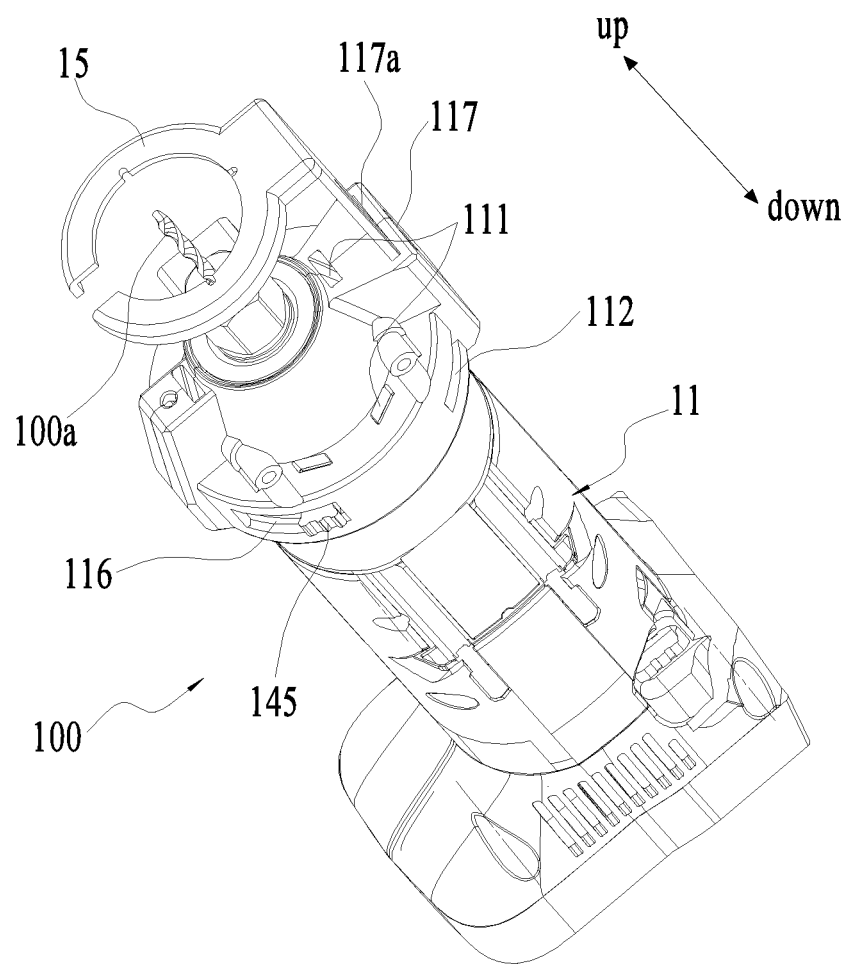
FIG. 1 is a perspective view of an electric tool according to a first example of the present disclosure.

An electric tool 100 of a first example shown in FIG. 1 is used for a user to drill holes in a wall or a workpiece, or to cut grooves of different shapes in the wall or the workpiece. In the present example, the electric tool 100 is a drywall cutting tool, which cuts a rectangular groove in the wall or the workpiece according to a certain track by installing a working attachment 100a, and the rectangular groove can be used to install a switch box. The electric tool 100 can engrave some patterns in the wall by installing other working attachments. In the present example, the wall or the workpiece is gypsum board, or the wall may also include a gypsum board.

Of course, it can be understood that in other examples, the electric tool 100 may also be other power tools. For example, the electric tool 100 may be an angle grinder, an electric drill, etc. As long as these electric tools adopt the substantive solutions of this example, they all belong to the protection scope of the present disclosure.

Figure 2:
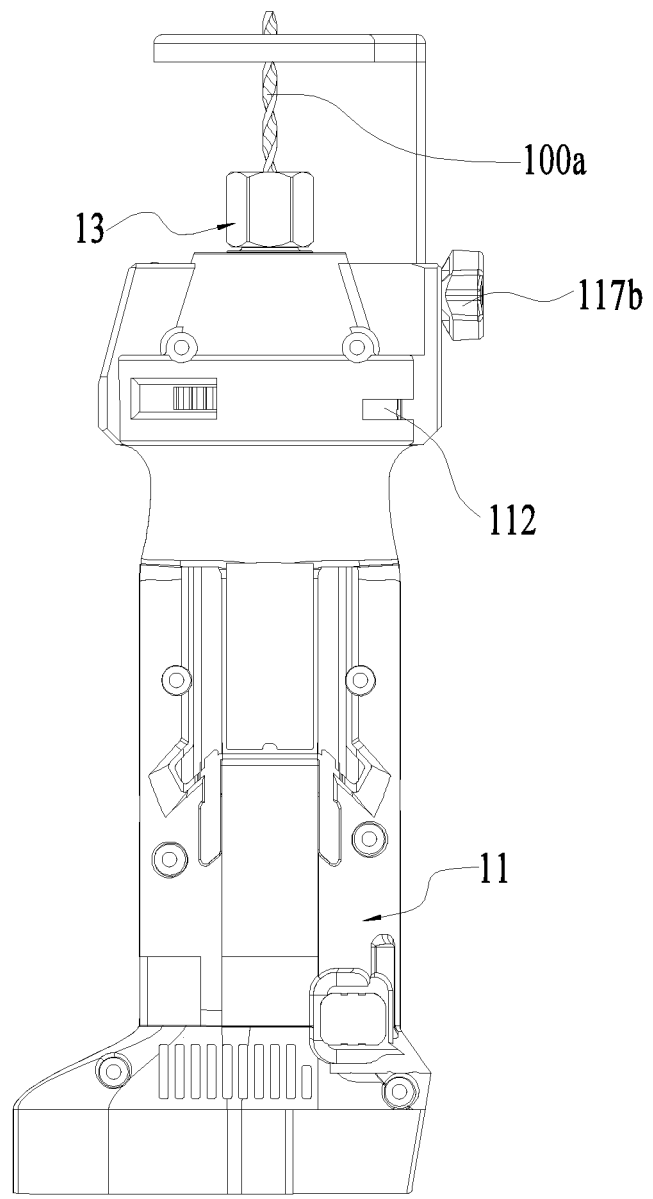
FIG. 2 is a side view of the electric tool of FIG. 1.
Figure 3:
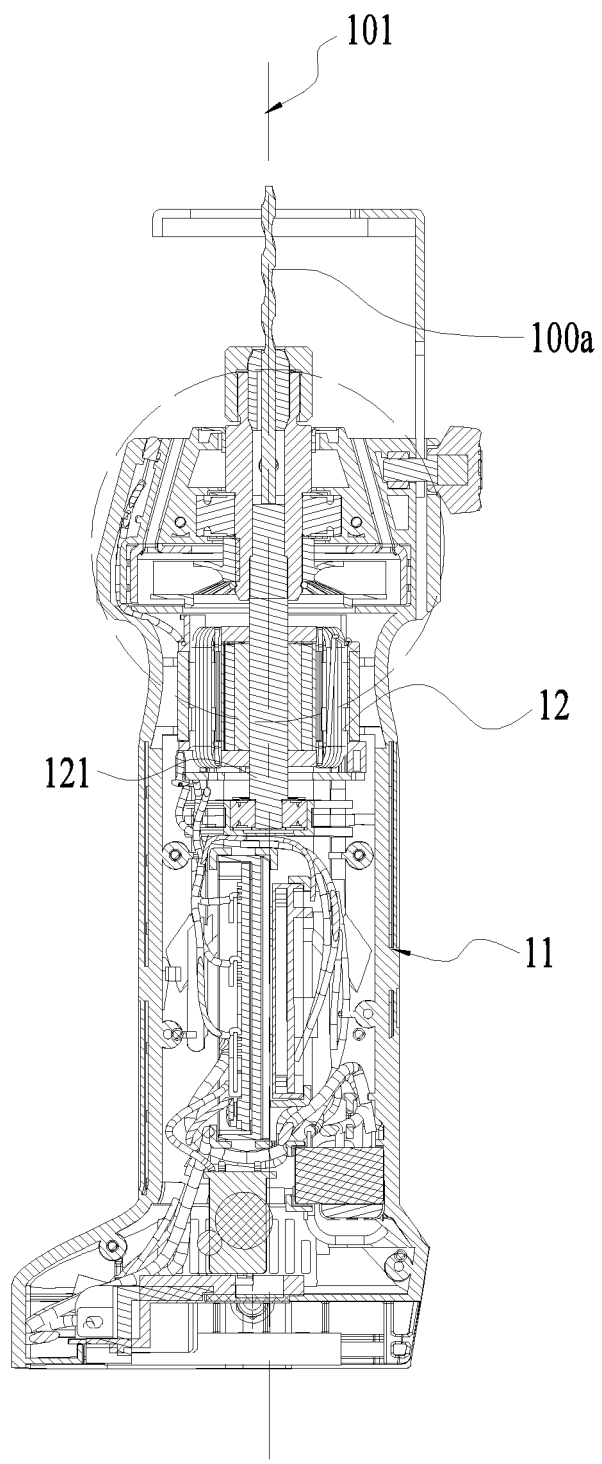
FIG. 3 is a cross-sectional view of the electric tool of FIG. 2.

As shown in FIGS. 1-3, the electric tool 100 includes a housing 11, a motor 12, and a power output assembly 13. The motor 12 includes a motor shaft 121 that can rotate around a first axis 101, and the housing 11 extends along the first axis 101. The motor 12 is arranged in the housing 11 to provide power for the power output assembly 13, so that the power output assembly 13 has a power to process the workpiece. The power output assembly 13 is arranged at an upper end of the housing 11. The power output assembly 13 is connected with the motor 12 for processing the workpiece driven by the motor 12. The power output assembly 13 is used to install the working attachment 100a, which in this example is a bit.

As shown in FIG. 1, the housing 11 is provided with a first air outlet 111 and a second air outlet 112. The first air outlet 111 has a first air outlet angle, and the first air outlet 111 guides an airflow inside the housing 11 to blow toward the outside of the housing 11 in a first direction. The second air outlet 112 has a second air outlet angle, and the second air outlet 112 guides the airflow inside the housing 11 to blow toward the outside of the housing 11 in a second direction.

In this present example, the first air outlet 111 is provided at the upper end of the housing 11, so that the airflow from the first air outlet 111 will blow toward a working area on an upper side of the electric tool 100. When the electric tool 100 is operated on the wall or the workpiece, the first air outlet 111 can blow the airflow toward the wall or the workpiece, thereby blowing dust on the wall or the workpiece away from the wall or the workpiece.

The second air outlet 112 is provided on a side surface of the housing 11, so that the airflow from the second air outlet 112 will blow toward a side of the electric tool 100. When the electric tool 100 opens a hole in a wall that has been renovated, if the airflow blows to the wall through the first air outlet 111, the dust on the wall easily bounces back to an opposite wall, which is easy to make the opposite wall dirty. While blowing through the second air outlet 112 on the side surface of the housing 11, the dust on the wall can be dropped to the ground along the wall, so as not to pollute the opposite wall.

Figure 4:
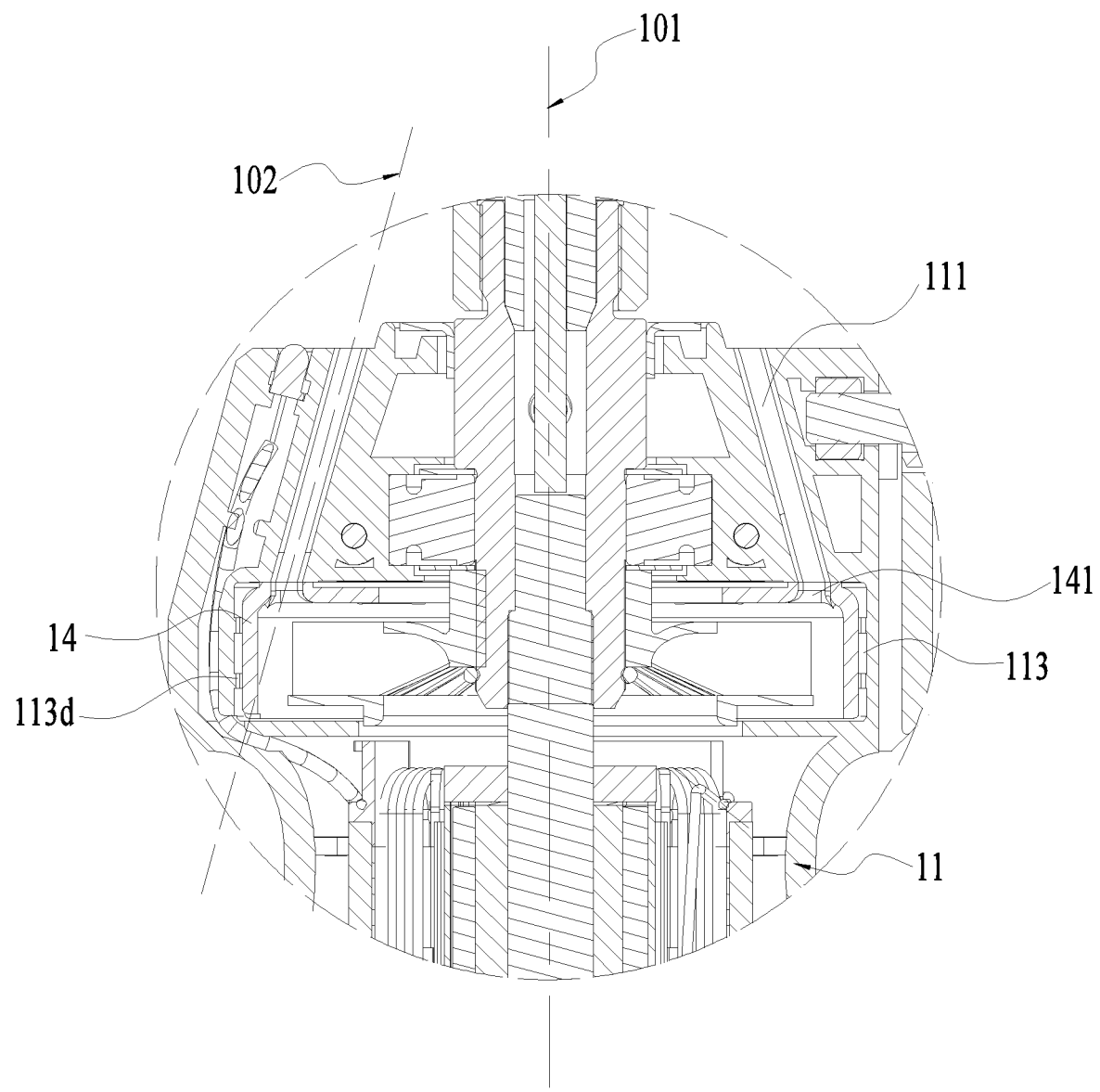
FIG. 4 is an enlargement view of a part of the electric tool in FIG. 3.
Figure 5:
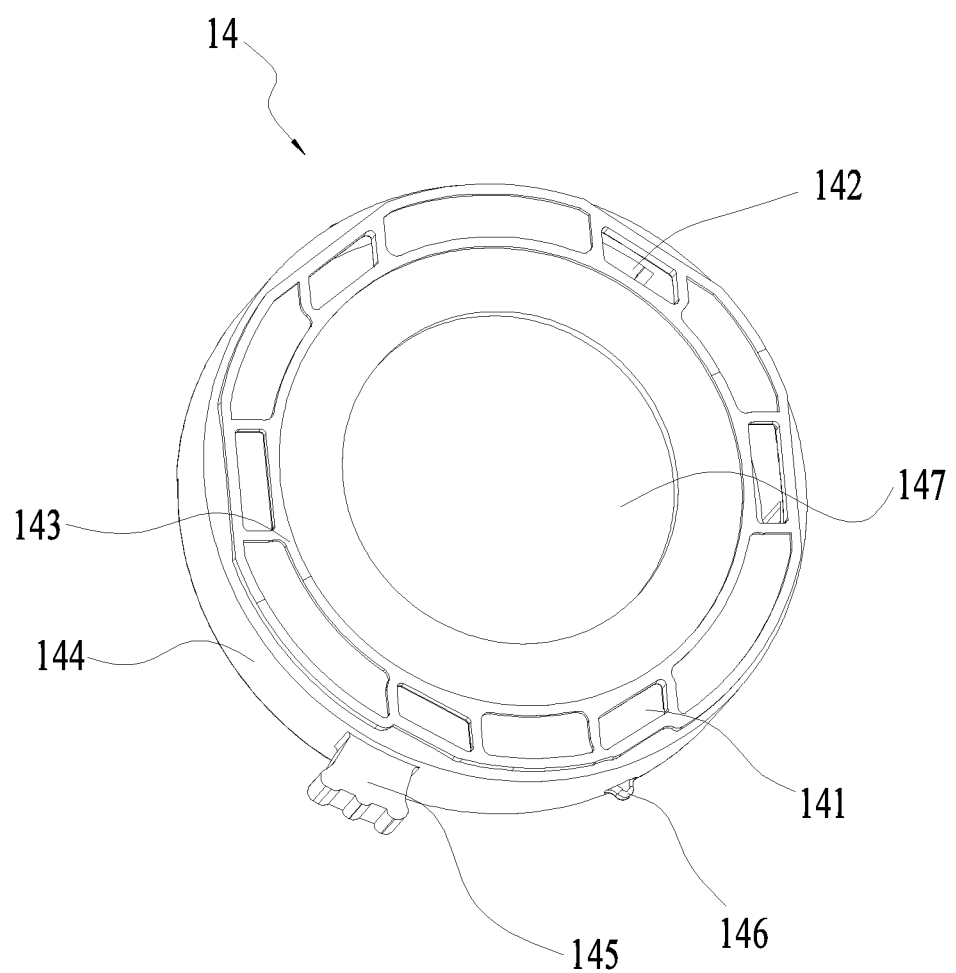
FIG. 5 is a perspective view of a switching member of the electric tool of FIG. 3.

As shown in FIGS. 3-5, the electric tool 100 further includes a switching member 14, which is arranged at an upper end of the motor 12 along the first axis 101 and at least partially arranged in the housing 11. The switching member 14 can be rotated to a first position and a second position relative to the housing 11. When the switching member 14 is rotated to the first position, the switching member 14 allows the airflow to flow out of the first air outlet 111 and close the second air outlet 112. At this time, the first air outlet 111 can guide the airflow to blow out of the housing 11 along the first direction, and the second air outlet 112 is closed, so the airflow cannot blow out of the housing 11 from the second air outlet 112. When the switching member 14 is rotated to the second position, the switching member 14 allows the airflow to flow out of the second air outlet 112 and close the first air outlet 111. At this time, the second air outlet 112 can guide the airflow to blow out of the housing 11 in the second direction, and the first air outlet 111 is closed, so the airflow cannot blow out of the housing 11 from the first air outlet 111.

In the present example, the switching member 14 is a wind guiding member. The switching member 14 is provided with a third air outlet 141 and a fourth air outlet 142. The switching member 14 is configured such that when the switching member 14 is rotated to the first position, the third air outlet 141 is in communication with the first air outlet 111, the fourth air outlet 142 is closed by the housing 11, and the second air outlet 112 is closed by the switching member 14. When the switching member 14 is rotated to the second position, the fourth air outlet 142 is in communication with the second air outlet 112, the third air outlet 141 is closed by the housing 11, and the first air outlet 111 is closed by the switching member 14. Here, a wind direction can be switched by changing the closed and open states of different air outlets on the switching member 14, and only one switching member 14 and a corresponding air outlet on the housing 11 are needed to switch the wind direction. The structure of the electric tool 100 is simple, the cost of the electric tool 100 is low, and it is convenient to install and disassemble the electric tool 100. The wind direction is switched by rotating the switching member 14, which is easy to operate.

As shown in FIGS. 4-5, the switching member 14 is arranged around the first axis 101, and the switching member 14 includes an upper wall 143 and a side wall 144. The upper wall 143 extends substantially along a plane perpendicular to the first axis 101, and the side wall 144 surrounds the first axis 101 and extends in a direction parallel to the first axis 101. The third air outlet 141 is provided on the upper wall 143 of the switching member 14, and the fourth air outlet 142 is provided on the side wall 144 of the switching member 14. In some other examples, air outlets may only be provided on an upper wall or a side wall of a switching member, and air outlet directions can be switched by changing an air outlet angle of each air outlets. For example, the air outlets can be set to have different inclination angles relative to the first axis 101, and the air outlets with the different inclination angles can be set to achieve airflow in different directions.

The airflow blown from the electric tool 100 can have many sources. For example, a heat dissipation fan arranged on a rotor of the motor 10 can be used to directly output the airflow, so that the rotation of the motor 100 can be directly used to realize a dust blowing function and achieve the purpose of energy saving. It is also possible to separately provide an air outlet structure for air outlet in the electric tool 100, which is not limited here.

Figure 6:
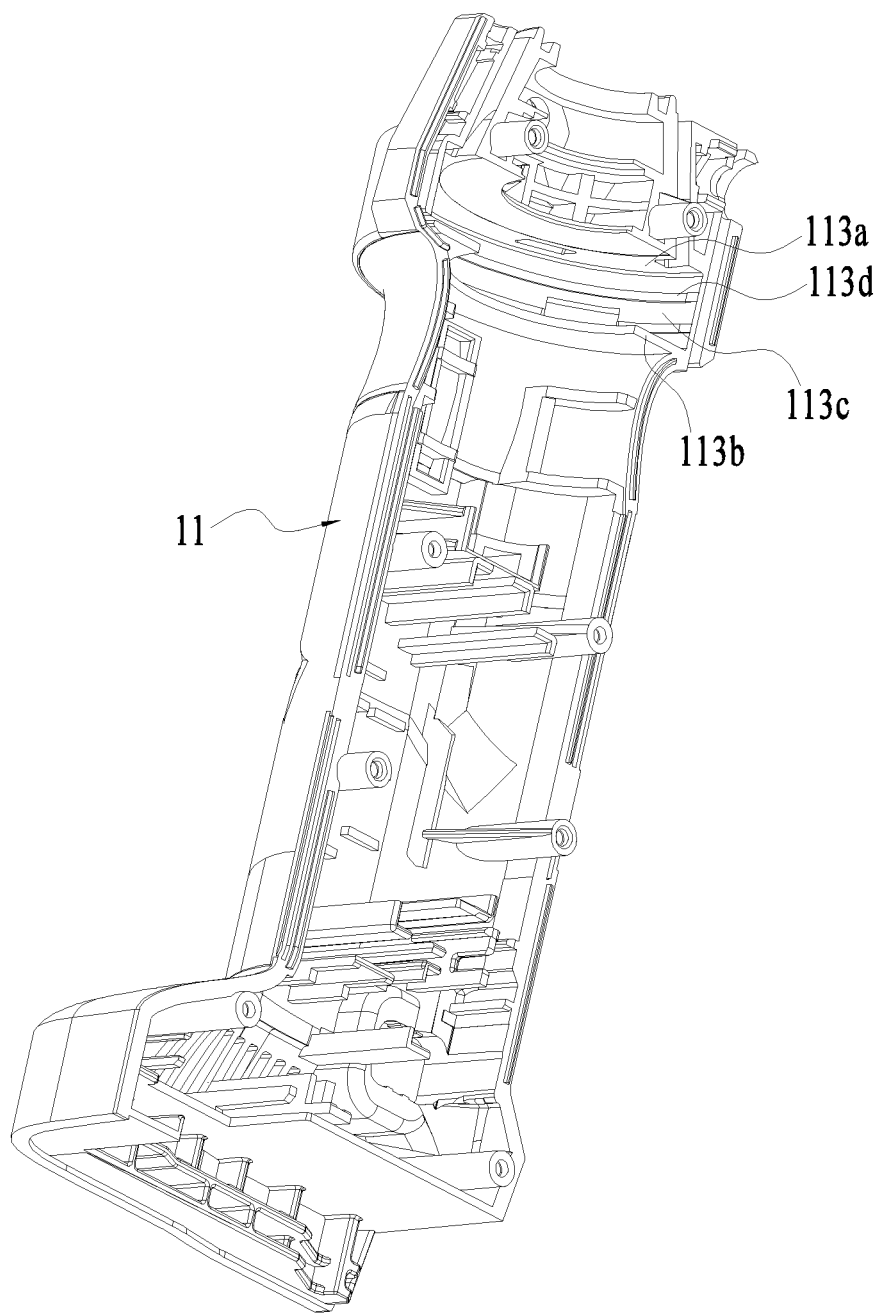
FIG. 6 is a perspective view of a part of a housing of the electric tool of FIG. 1.

As shown in FIGS. 4-6, a mounting groove 113 for mounting the switching member 14 is provided in the housing 11, and the mounting groove 113 includes an upper side wall 113a, a lower side wall 113b, and a bottom wall 113c. The upper side wall 113 of the mounting groove 113 contacts with the upper wall 143 of the switching member 14, and the lower side wall 113b of the mounting groove 113 abuts against a lower end of the switching member 14, which facilitates the positioning and fixing of the switching member 14. In addition, abutting an upper end and the lower end of the switching member 14 with the upper side wall 113a and the lower side wall 113b of the mounting groove 113 can also form a closed space between the side wall 144 of the switching member 14 and the mounting groove 113, so as to avoid the airflow from the fourth air outlet 142 on the side wall 144 leaks from the closed space between the side wall 144 of the switching member 14 and the mounting groove 113 to the third air outlet 141 at the upper end of the switching member 14, which also prevents the airflow from the third air outlet 141 leaks from the closed space between the side wall 144 of the switching member 14 and the mounting groove 113 to the fourth air outlet 142 of the side wall 144, so as to avoid the interference of the airflow from the third air outlet 141 and the fourth air outlet 142, causing the wind direction to be turbulent.

The bottom wall 113c of the mounting groove 113 is provided with flanges 113d, the flanges 113d are arranged along a circumferential direction of the housing 11, and the flanges 113d are in contact with the side wall 144 of the switching member 14 to reduce a frictional force between the side wall 144 of the switching member 14 and the bottom wall 113c of the mounting groove 113, thereby facilitating the rotation of the switching member 14 in the mounting groove 113. The flanges 113d also facilitate clamping of the switching member 14 in the mounting groove 13. In addition, the number of the flanges 113d is two, and the two flanges 113d are spaced along a direction of the first axis 101, which can lock the airflow from the fourth air outlet 142 in an air duct formed between the two flanges 113d. It is conducive to the concentration of airflow and avoids that the airflow is too diffuse, and the strength of the airflow is weak to affect the dust blowing effect.

The housing 11 is a two-half structure, so the mounting groove 113 is also in two halves, which are respectively arranged on two half housings. After the two half housings are combined, the mounting groove 113 can be formed. Therefore, when assembling, the switching member 14 is clamped in one half of the mounting groove 113, and then the other half of the mounting groove 113 is aligned with the switching member 14, and the two half housings are closed to make the switching member 14 is stuck in the mounting groove 113.

The switching member 14 is provided with a through hole 147 for the rotor of the motor 12 to pass through. The rotor of the motor 12 needs to pass through the switching member 14 to be connected to the power output assembly 13. Therefore, providing the through hole 147 on the switching member 14 can facilitate the installation of the motor 12 to the power output assembly 13.

Since the switching member 14 need to rotate in the housing 11, an operating mechanism is provided to toggle the switching member 14. The operating mechanism can be arranged on the housing 11, for example, a lever or a push button is provided on the housing 11. The operating mechanism can also be integrally formed with the switching member 14. In the present example, the switching member 14 is provided with an operating structure 145 for driving the switching member 14 to rotate. The operating structure 145 is a rib integrally formed on the side wall 144 of the switching member 14, which can reduce a number of parts and avoid the need to additionally connect the operating structure 145 and the switching member 14 during assembly, thereby shortening an assembly time. In addition, the operating structure 145 and the switching member 14 are integrally formed, which can increase the connection strength between the operating structure 145 and the switching member 14, thereby prolonging the service life of the electric tool 100.

As shown in FIG. 1, the housing 11 is provided with a slot-shaped hole 116 for the rib to pass through. The slot-shaped hole 116 extends along a circumferential direction of the housing 11, and the rib can slide along the circumferential direction of the housing 11 in the slot-shaped hole 116, so as to make the rib push the switching member 14 to rotate in the housing 11 to realize the switching of the wind direction.

As shown in FIG. 6, the side wall 144 of the switching member 14 is provided with a protrusion 146 to facilitate positioning when the switching member 14 is rotated. After the switching member 14 is rotated to the first position or the second position, the protrusion 146 is matched with a corresponding groove on the housing 11 to realize the positioning of the switching member 14. As shown in FIG. 6, the edge of the protrusion 146 is arc-shaped, so that the protrusion 146 can be smoothly inserted into and slid out of the corresponding groove, thereby facilitating the rotation and positioning of the switching member 14.

As shown in FIG. 5, the first air outlet 111 extends along a first line 102 that obliquely intersects the first axis 101. In this way, the first air outlet 111 can guide airflow to the working attachment 100a extending along the first axis 101.

As shown in FIGS. 1-5, there are a plurality of the first air outlets 111, and the plurality of the first air outlets 111 are arranged in the circumferential direction around the first axis 101. There is a plurality of third air outlets 141, and the plurality of third air outlets 141 is distributed along a circumferential direction of the switching member 14 so that the upper end of the switching member 14 can uniformly discharge airflow.

As shown in FIG. 1, the upper end of the housing 11 is provided with a guard 15 for protecting the power output assembly 13. Specifically, in the example shown in FIG. 1, the guard 15 is used to protect the working attachment 100a mounted to the power output assembly 13. As that guard 15 is mount at the upper end of the housing 11, the upper end of the housing 11 needs to be provided with a mounting rib 117 to mount the guard 15. As shown in FIG. 1, the mounting rib 117 is provided with a slot 117a extending along the first axis 101, and the guard 15 is inserted into the slot 117a.

As shown in FIG. 3, a locking member 117b inserted into the slot 117a from the outside of the housing 11 is provided above the slot 117a to lock the guard 15 in the slot 117a. The guard 15 is provided with a groove-shaped fixing hole 51 extending along the first axis 101 so that the guard 15 can be adjusted to a mounting position along the first axis 101 to adjust the length of the guard 15 extending out of the upper end of the housing 11.

As shown in FIG. 5, the first air outlet 111 is provided on the mounting rib 117, so that the first air outlet 111 on the mounting rib 117 is a long air duct, which is conducive to directly blowing the airflow to an uppermost end and improving the dust blowing effect.

Figure 7:
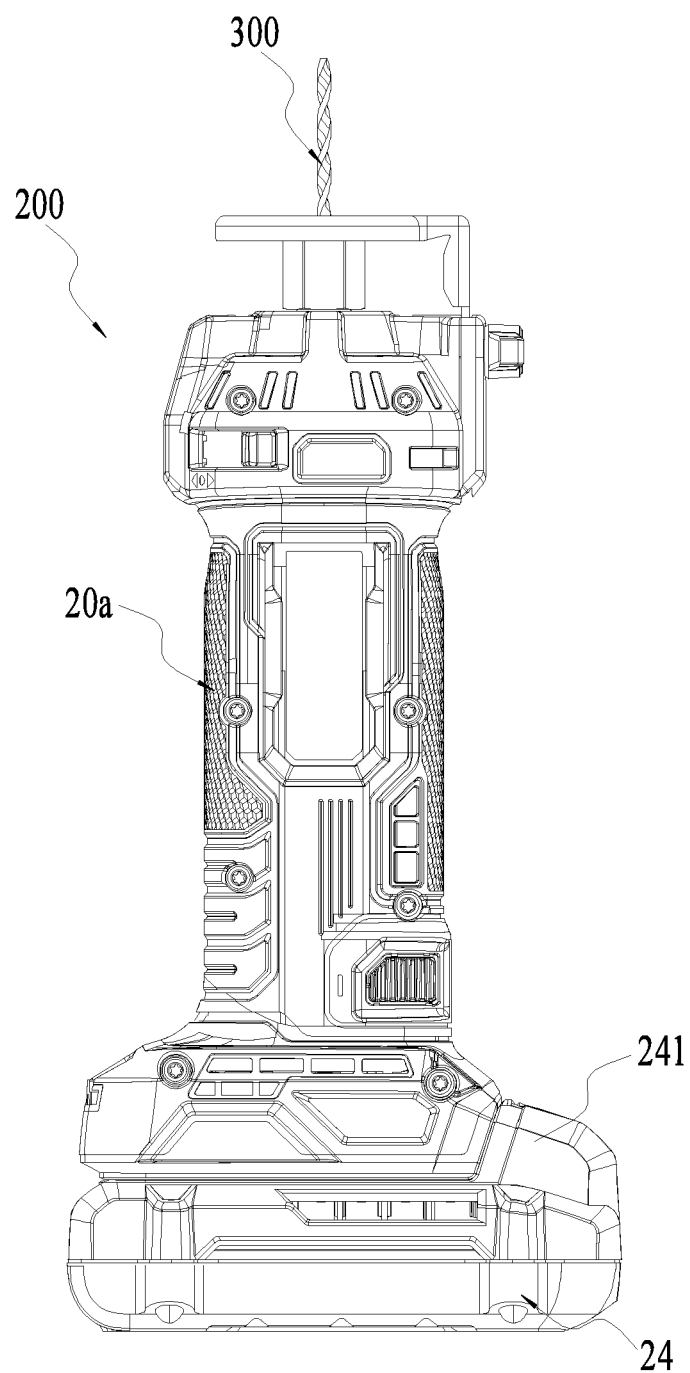
FIG. 7 is a structural view of an electric tool according to a second example of the present disclosure.
Figure 8:
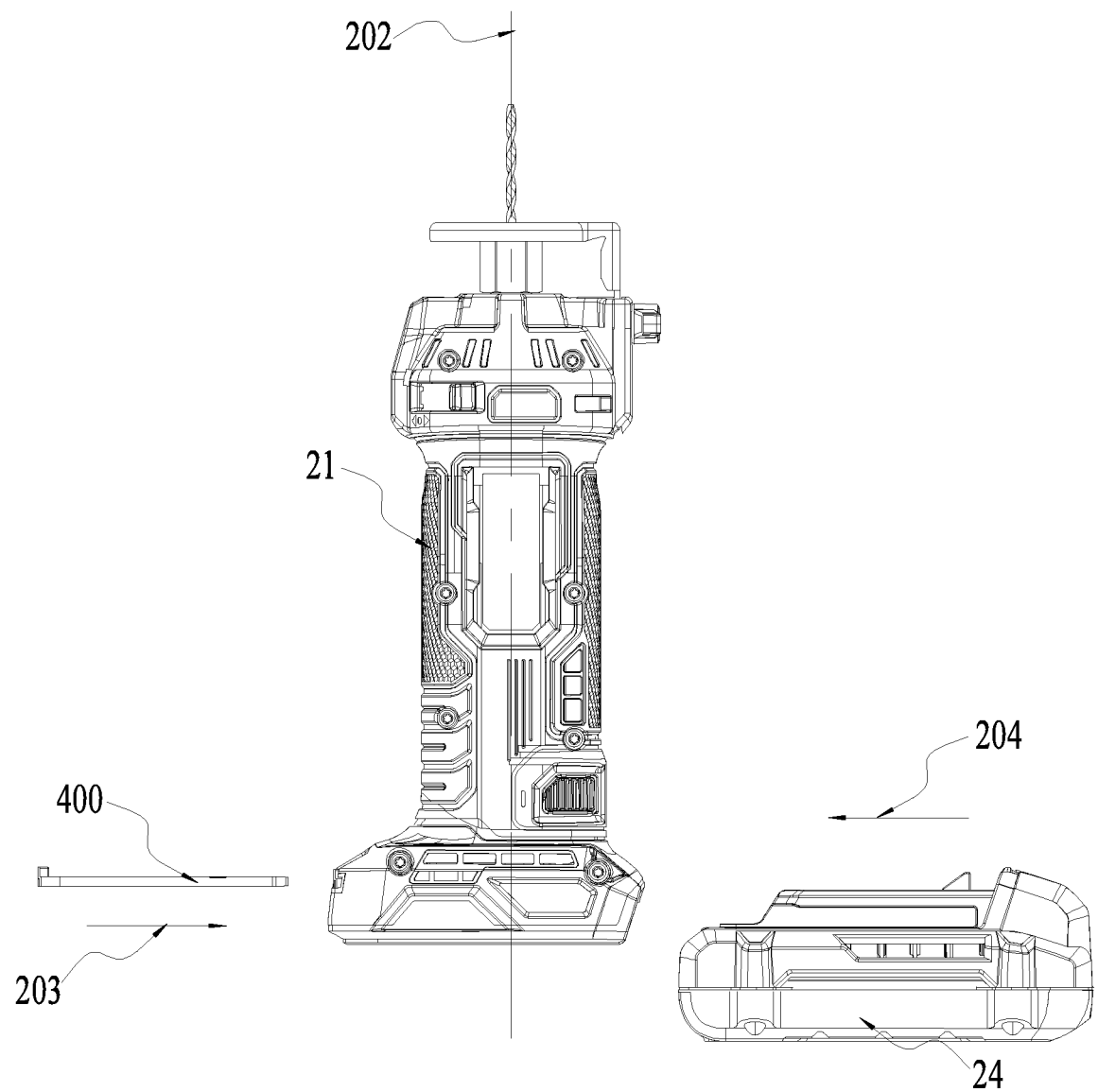
FIG. 8 is a structural view of the electric tool of FIG. 7 when an operating member separated from a battery pack and a main body.
Figure 9:
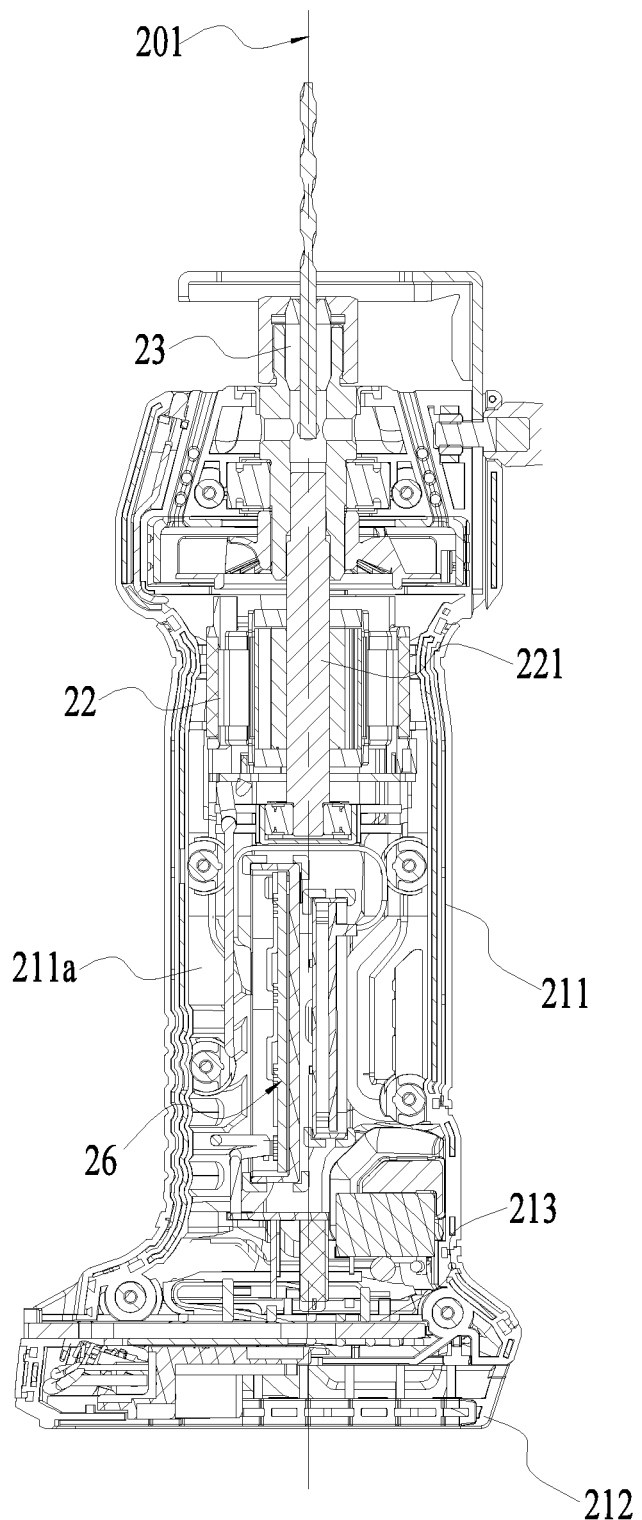
FIG. 9 is a cross-sectional view of the main body of FIG. 7.
Figure 10:
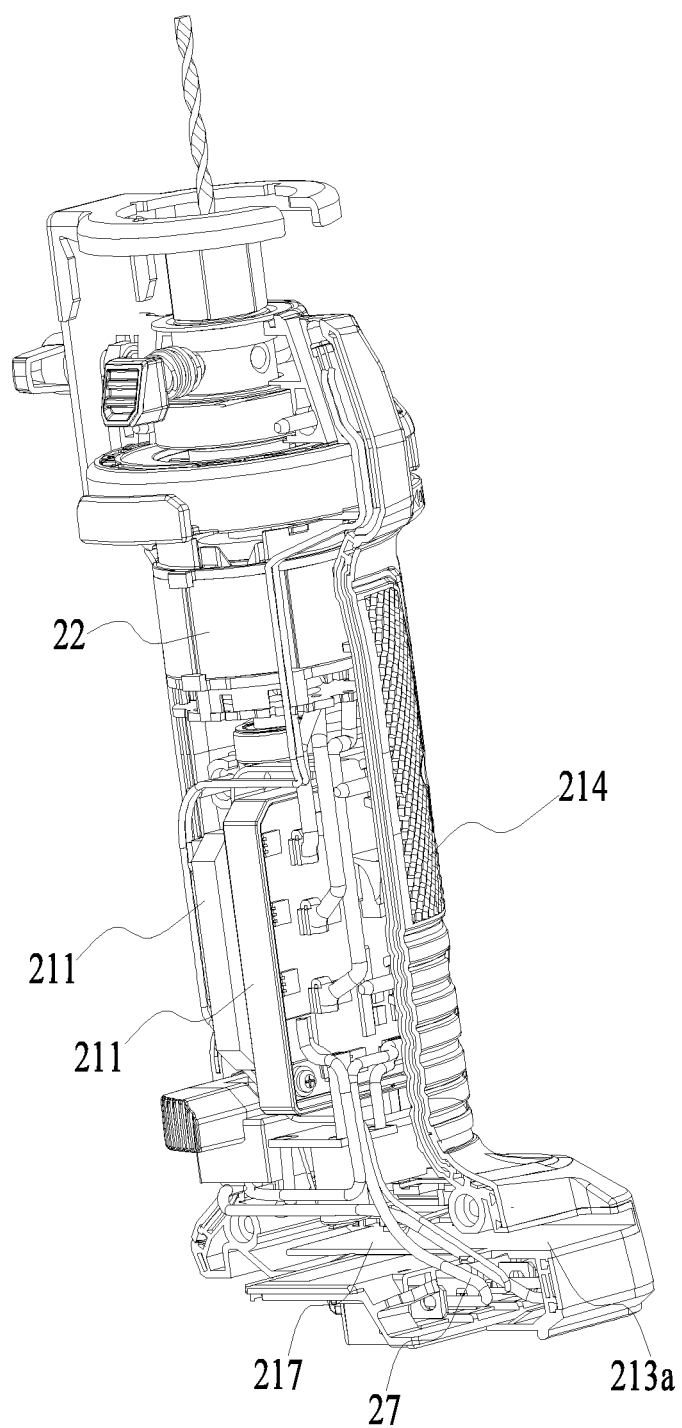
FIG. 10 is a perspective view of the main body of FIG. 7 with the second housing portion removed.

An electric tool 200 of a second example shown in FIG. 7 is used for a user to drill holes in a wall or a workpiece, or to cut grooves of different shapes in the wall or the workpiece. In the present example, the electric tool 200 is a drywall cutting tool, which cuts a rectangular groove in the wall or the workpiece according to a certain track by installing a working attachment 300, and the rectangular groove can be used to install a switch box. The electric tool 200 can engrave some patterns in the wall by installing other working attachments. In the present example, the wall or the workpiece is gypsum board, or the wall may also include a gypsum board.

As shown in FIG. 7, the electric tool 200 includes a main body 20a and a battery pack 24. The battery pack 24 can be detachably installed to the main body 20a. When the battery pack 24 is installed to the main body 20a, the battery pack 24 can provide an energy source. As shown in FIGS. 7-10, the main body 20a includes a housing 21, a motor 22, and an output member 23. The housing 21 is used to accommodate at least part of the motor 22, the motor 22 is used to output power to drive the output member 23 to move, and the output member 23 is used to connect with the working attachment 300 to drive the working attachment 300 to work on the wall or the workpiece.

Figure 11:
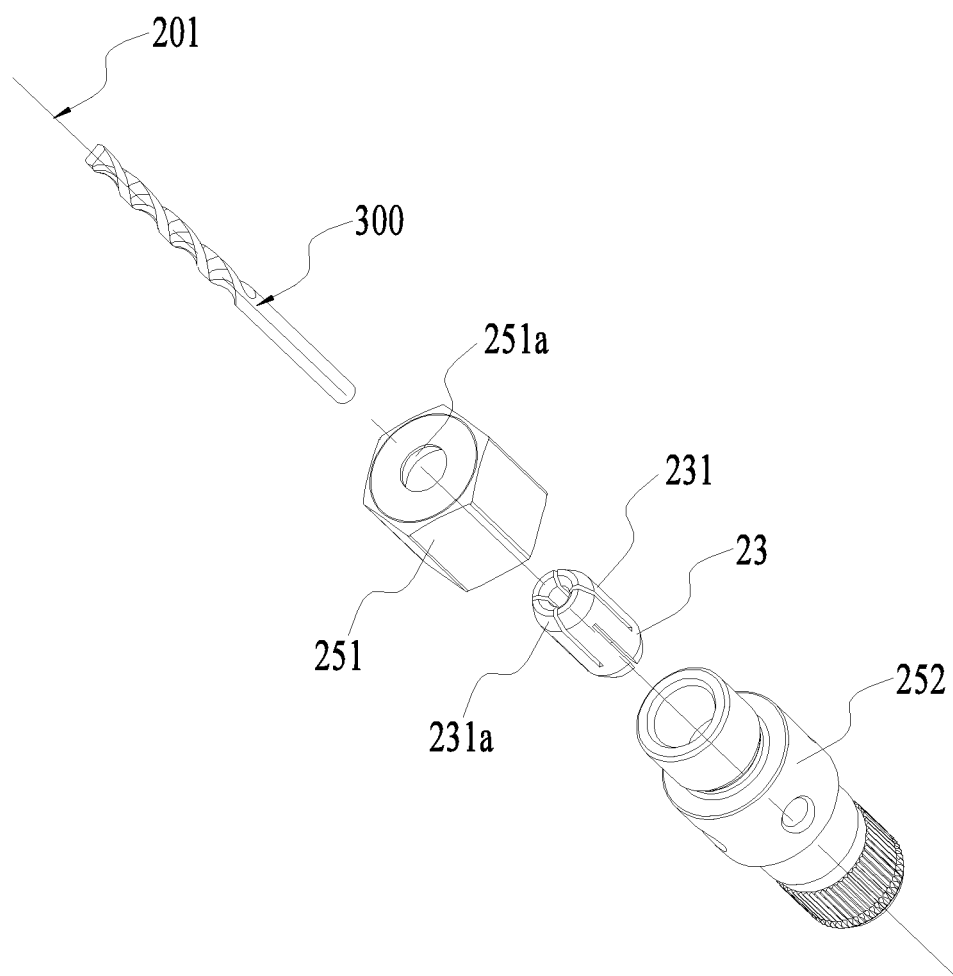
FIG. 11 is an exploded view of a locking member, an output member, output shaft and a working attachment of FIG. 7.
Figure 12:
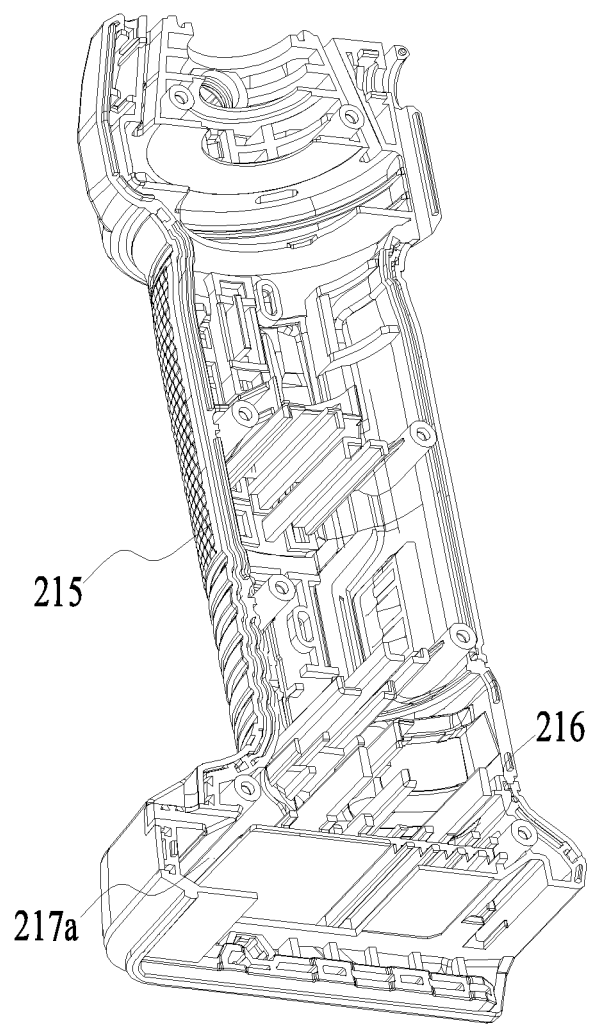
FIG. 12 is a perspective view of the second housing portion of the main body of FIG. 7.
Figure 13:
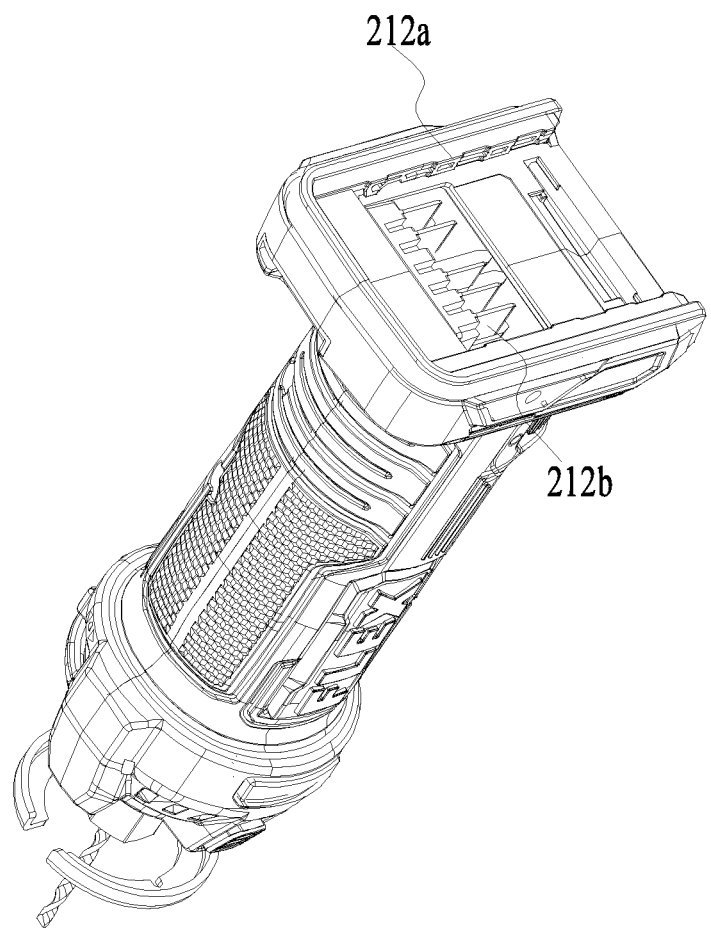
FIG. 13 is a perspective view of the main body of FIG. 7 at an angle.

As shown in FIG. 11, the output member 23 includes clamping portions 231 capable of clamping the working attachment 300. The output member 23 can be driven by the motor 22 to rotate around a first axis 201. A number of the clamping portions 231 is multiple, and the multiple clamping portions 231 are sequentially arranged in a circumferential direction around the first axis 201. The electric tool 200 further includes a locking member 251 for mounting the working attachment 300 to the output member 23. The locking member 251 has a locked state and a released state. When the locking member 251 is in the locked state, the locking member 251 drives the multiple of clamping portions 231 to contract in a direction close to the first axis 201. At this time, a mounting hole surrounded by the multiple of clamping portions 231 is reduced, so that the clamping portions 231 clamp the working attachment 300 inserted into the mounting hole. When the locking member 251 is in the released state, the clamping portions 231 expand in a direction away from the first axis 201. At this time, the mounting hole surrounded by the multiple of clamping portions 231 becomes larger, so that the clamping portions 231 release the working attachment 300. The working attachment 300 can be pulled out from the mounting hole by the user.

In the present example, the locking member 251 is a movable member that can move relative to the output member 23, and the locking member 251 can move to a first position and a second position relative to the output member 23. When the locking member 251 is in the first position, the locking member 251 is in the locked state such that the output member 23 clamps the working attachment 300. When the locking member 251 is located at the second position, the locking member 251 is in the released state that allows the output member 23 to release the working attachment 300. When the locking member 251 is in the locked state, the working attachment 300 is fixed relative to the output member 23, the working attachment 300 can be directly locked to the output member 23 by the locking member 251, and the working attachment 300 can also be locked by the output member 23 itself to be fixed relative to the output member 23. Alternatively, the working attachment 300 may also be an element driven by the locking member 251, and the element is driven and locked by the locking member 251.

Specifically, in the present example, the locking member 251 is a hexagonal nut. Of course, it is understandable that the locking member 251 can also be nuts of other specifications, or the locking member 251 can be other slidable sleeves. The inner wall of the locking member 251 is formed with internal threads. The electric tool 200 further includes an output shaft 252 fixedly connected to the output member 23. The output shaft 252 is connected between the motor 22 and the output member 23. The outer wall of the output shaft 252 is formed with external threads. The locking member 251 is sleeved on the output shaft 252, and the locking member 251 can be screwed relative to the output shaft 252.

When the locking member 251 rotates relative to the output shaft 252, the locking member 251 can move along the first axis 201 relative to the output shaft 252. The inner wall of the locking member 251 is further formed with a first inclined surface 251a, and each of the clamping portions 231 is formed with a second inclined surface 231a. When the locking member 251 moves toward the motor 22 along the first axis 201 relative to the output shaft 252, the first inclined surface 251a drives the second inclined surface 231a to make the clamping portions 231 to contract to clamp the working attachment 300. When the locking member 251 is away from the motor 22 along the first axis 201 relative to the output shaft 252, the first inclined surface 251a releases the second inclined surface 231a, the clamping portions 231 releases the working attachment 300, and the working attachment 300 can be detached.

The electric tool 200 further includes an operating member 400 for the user to operate, and the operating member 400 can be detached from the electric tool 200. When the operating member 400 is detached from the electric tool 200 by the user, the user can use the operating member 400 to drive the locking member 251 to switch between the locked state and the released state. When the user does not use the operating member 400, the operating member 400 is mounted on the housing 21 of the electric tool 200. On the one hand, it is convenient for the user to use the operating member 400 anytime and anywhere, and on the other hand, it can also avoid the problem that the working attachment 300 is not easily disassembled due to the loss of the operating member 400.

The housing 21 includes a gripping portion 211, a coupling portion 212, and a mounting portion 213. The gripping portion 211 is used for the user to hold, the coupling portion 212 is used for detachably coupling the battery pack 24, and the mounting portion 213 is used for detachably installing the operating member 400. In this example, the housing 21 extends substantially along a first line 202 parallel to the first axis 201, the output member 23 is provided at one end of the housing 21, and the coupling portion 212 is provided at the other end of the housing 21. The gripping portion 211 extends along the first line 202. The gripping portion 211 is formed with a receiving cavity 211a, and the motor 22 is at least partially disposed in the receiving cavity 211a. In this way, the electric tool 200 has a reasonable layout and a small size. The electric tool 200 further includes a circuit board assembly 26 for controlling the motor 22, and the circuit board assembly 26 is also arranged in a receiving cavity 211a surrounded by the gripping portion 211. The mounting portion 213 is arranged between the gripping portion 211 and the coupling portion 212, the mounting portion 213 is formed with a mounting groove 213a, and the operating member 400 can be inserted into the mounting groove 213a by the user, so as to effectively prevent the loss of the operating member 400, and facilitate the user to use the operating member 400 anytime and anywhere to remove or install the working attachment 300. The mounting portion 213 is arranged between the gripping portion 211 and the coupling portion 212, so that a space between the gripping portion 211 and the coupling portion 212 can be fully utilized, and the size of the gripping portion 211 will not be increased, so as to avoid the problem of the user holding discomfort caused by the thickening of the gripping portion 211. Furthermore, the length of the gripping portion 211 in the first line 202 will not increase, so that the size of the electric tool 200 is smaller. Furthermore, the mounting portion 213 is provided between the gripping portion 211 and the coupling portion 212, and the size of the coupling portion 212 can be kept unchanged, so that when the user's hand holds the gripping portion 211, the coupling portion 212 will not interfere with the user's hand, thus improving the holding comfort. In this example, the coupling portion 212 is provided at one end of the gripping portion 211, and the size of the coupling portion 212 relative to the gripping portion 211 in a direction perpendicular to the first line 202 is larger. In this way, when the housing 21 extends from the gripping portion 211 to the coupling portion 212, the size of an area between the gripping portion 211 and the coupling portion 212 will gradually become larger, and the area can be fully utilized to provide the mounting groove 213a without increasing the size of the housing 21 too much, thereby improving the utilization efficiency of the housing 21.

A groove wall of the mounting groove 213a also guides the operating member 400 to be coupled to the mounting groove 213a along a second line 203, the second line 203 intersects the first line 202 to form an included angle, and the included angle is greater than or equal to 45 degrees and less than or equal to 90 degrees. In this example, the operating member 400 is a wrench, and the wrench is a thin piece. Thus, when the mounting portion 213 is disposed between the coupling portion 212 and the gripping portion 211, an insertion direction of the operating member 400 is reasonably arranged with respect to the extension direction of the gripping portion 211, so that the space between the mounting portion 213 and the coupling portion 212 can be fully utilized without increasing the size of the housing 21 in the first line 202 and the size of the coupling portion 212 in the direction perpendicular to the first line 202. It should be noted that the operating member 400 is coupled to the mounting groove 213a in the first line 202, and it does not limit whether the operating member 400 is coupled to the mounting portion 213 to the left or right along the first line 202. The included angle formed by the intersection of the second line 203 and the first line 202 is an angle formed by the intersection of the insertion direction of the operating member 400 and the first line 202. Further, the second line 203 is perpendicular to the first line 202. In other examples, the operating member may also be coupled to the housing from front to back, and the operating member may also be coupled to the housing from back to front, a direction in which the operating member is coupled to the housing is perpendicular to a direction in which the battery pack is mounted to the housing, and at this time, the direction in which the operating member is coupled to the housing is also perpendicular to a first line in which the housing extends.

In the present example, the first line 202 extended by the housing 21 and the first axis 201 of the rotation of the output member 23 are parallel to each other. The circuit board assembly 26 is arranged between the motor 22 and the battery pack 24. The circuit board assembly 26 is arranged in the housing 21 along the first line 202, and the motor shaft 221 of the motor 22 rotates around the first axis 201. In the first line 202, the output member 23, the motor 22, the circuit board assembly 26, the operating member 400 and the battery pack 24 are arranged in sequence, so that the electric tool 200 presents a slender structure, thus facilitating the user to hold.

The motor 22 is a brushless motor, and the idle speed of the motor 22 is greater than or equal to 15000 rpm and less than or equal to 35000 rpm. Furthermore, the idle speed of the motor 22 is greater than or equal to 25000 rpm and less than or equal to 32000 rpm. Thus, the output speed of the electric tool 200 can be high, so that the workpiece can be cut or a hole can be made in the wall quickly and efficiently.

The circuit board assembly 26 includes a first circuit board 261 and a second circuit board 262, and both the first circuit board 261 and the second circuit board 262 are disposed between the motor 22 and the mounting portion 213. The first circuit board 261 extends in a first plane parallel to the first line 202, and the second circuit board 262 extends in a second plane parallel to the first line 202, that is, the first circuit board 261 and the second circuit board 262 are arranged parallel to each other in the receiving cavity 211a. Because the mounting portion 213 is arranged between the gripping portion 211 and the coupling portion 212, the motor 22 and the circuit board assembly 26 need to be arranged in the receiving cavity 211a, and the size of the motor 22 is basically standard, so as long as the size of the circuit board assembly 26 along the first line 202 is reduced, the size of the gripping portion 211 in the first line 202 can be reduced, so that the size of the electric tool 200 in the first axis 201 is reduced. However, in this example, projections of the first circuit board 261 and the second circuit board 262 in the first plane are partially overlapped, so that the size of the circuit board assembly 26 in the first line 202 is greatly reduced. Furthermore, the size of the electric tool 200 in the first line 202 can be reduced. Therefore, even if the mounting portion 213 for mounting the operating member 400 is provided on the housing 21, the length of the electric tool 200 does not increase, but the length of the electric tool 200 decreases, which in turn makes the structure of the electric tool 200 more reasonable. In this example, the motor 22 is the brushless motor, the first circuit board 261 may be a control circuit board that controls the operation of the motor 22, and the second circuit board 262 is a power circuit board that controls the output power of the motor 22.

The coupling portion 212 is formed with a guiding structure 212a, and the guiding structure 212a guides the battery pack 24 to be coupling to the coupling portion 212 along the third line 204. The direction in which the battery pack 24 is mounted to the coupling portion 212 is parallel to and opposite to a direction in which the operating member 400 is inserted into the mounting groove 213a. In other words, the battery pack 24 is coupled to the coupling portion 212 from right to left along the third line 204, and the operating member 400 is inserted into the mounting groove 213a from left to right along the second line 203. In this way, the user will not be interfered by the operating member 400 when inserting the battery pack 24 and will not be interfered by the battery pack 24 when inserting the operating member 400. The second line 203 and the first line 202 are also perpendicular to each other, so that the length of the electric tool 200 in the direction along the first line 202 can be further shortened.

As shown in FIGS. 10-14, the housing 21 includes a first housing portion 214 and a second housing portion 215. The first housing portion 214 and the second housing portion 215 can be separated. The first housing portion 214 and the second housing portion 215 are connected together by screws. The first housing portion 214 is coupled to the second housing portion 215 along a fourth line 205 perpendicular to the first line 202. When the first housing portion 214 and the second housing portion 215 are combined, the gripping portion 211 and coupling portion 212 are formed. In this example, the first housing portion 214 and the second housing portion 215 are substantially symmetrical about a third plane parallel to the first line 202. It can be understood that when ribs formed on the first housing portion 214 for coupling to the second housing portion 215, the second housing portion 215 is not formed with the same corresponding structure as the ribs. At this time, it is also considered that the first housing portion 214 and the second housing portion 215 are substantially symmetrical about the third plane.

The coupling portion 212 is also provided with an access terminal 212b, which is used to form an electrical connection with the battery pack 24 to transfer the electric energy output by the battery pack 24 to the motor 22. The electric tool 200 further includes a wire 27 for electrically connecting the access terminal 212b and the circuit board assembly 26. The wire 27 needs to extend from the coupling portion 212 to the gripping portion 211 so that the wire 27 will pass through the area between the coupling portion 212 and the gripping portion 211. The housing 21 is also formed with a limiting portion 216 for limiting the wire 27 from passing through the mounting groove 213a, so that the limiting portion 216 limits the wire 27 so that the wire 27 avoids the mounting groove 213a, the wire 27 will not interfere with the operating member 400 when the operating member 400 is inserted into the mounting groove 213a, and the operating member 400 will not touch the wire 27 when inserted into the mounting groove 213a, thereby protecting the wire 27.

The housing 21 is further provided with a partition 217, which is used to separate the mounting groove 213a and the access terminal 212b, so that the mounting groove 213a will not affect the stability of the access terminal 212b. The wire 27 also needs to pass through the partition 217 to connect the access terminal 212b and the circuit board assembly 26. Therefore, the partition 217 is also formed with a through hole 217a through which the wire 27 passes, and the through hole 217a is located outside the mounting groove 213a. The through hole 217a and the mounting groove 213a are respectively located on both sides of the limiting portion 216, and the limiting portion 216 is formed on the partition 217. The limiting portion 216 divides the partition 217 into two areas, one of which is used to form the mounting groove 213a, and the other is used for the wire 27 to pass through. In this way, part of the groove wall of the mounting groove 213a is also formed by the partition 217. The areas on both sides of the limiting portion 216 are respectively used to form the mounting groove 213a and for the wire 27 to pass through, so as to protect the wire 27 without increasing the size of the electric tool 200.

Figure 14:
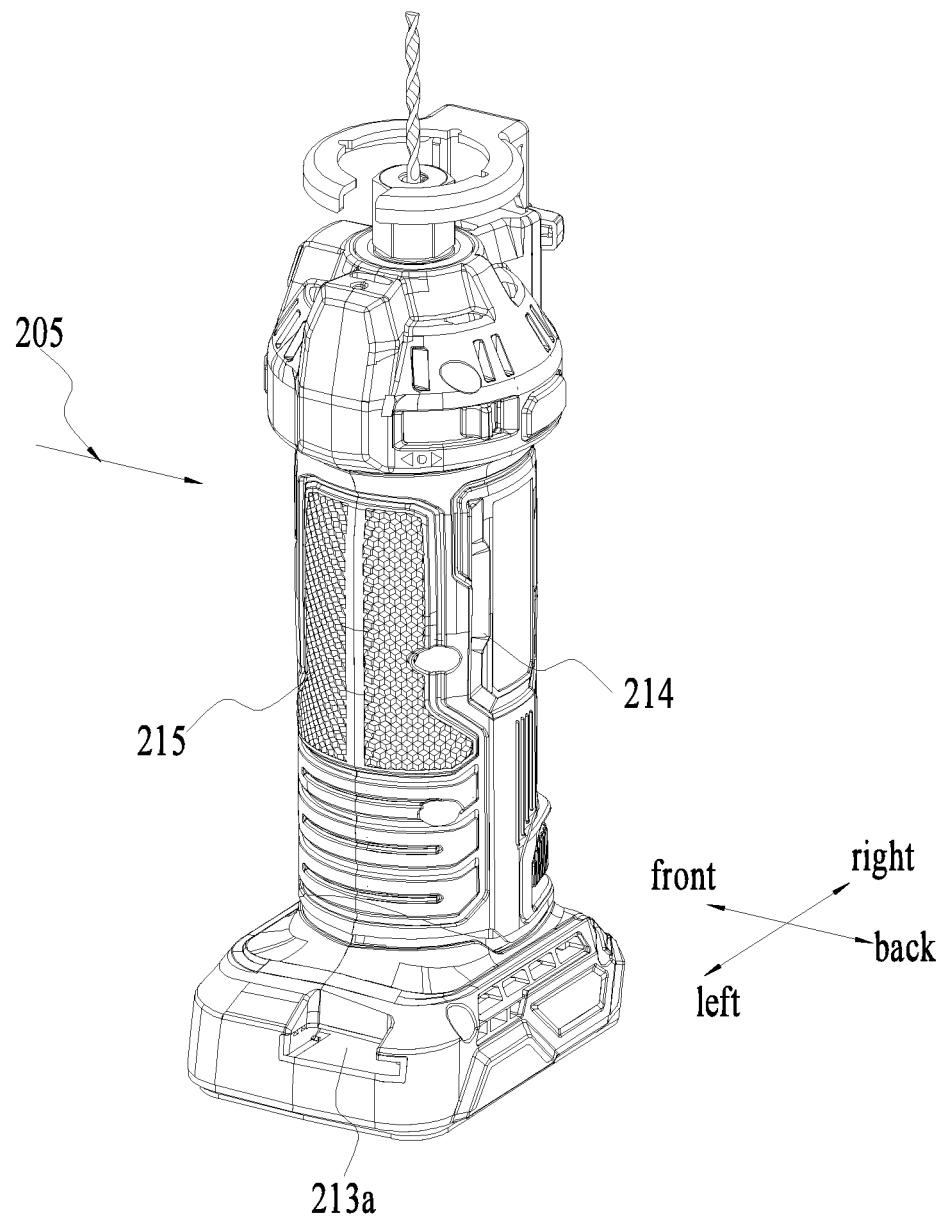
FIG. 14 is a perspective view of the main body of FIG. 7 at another angle.
Figure 15:
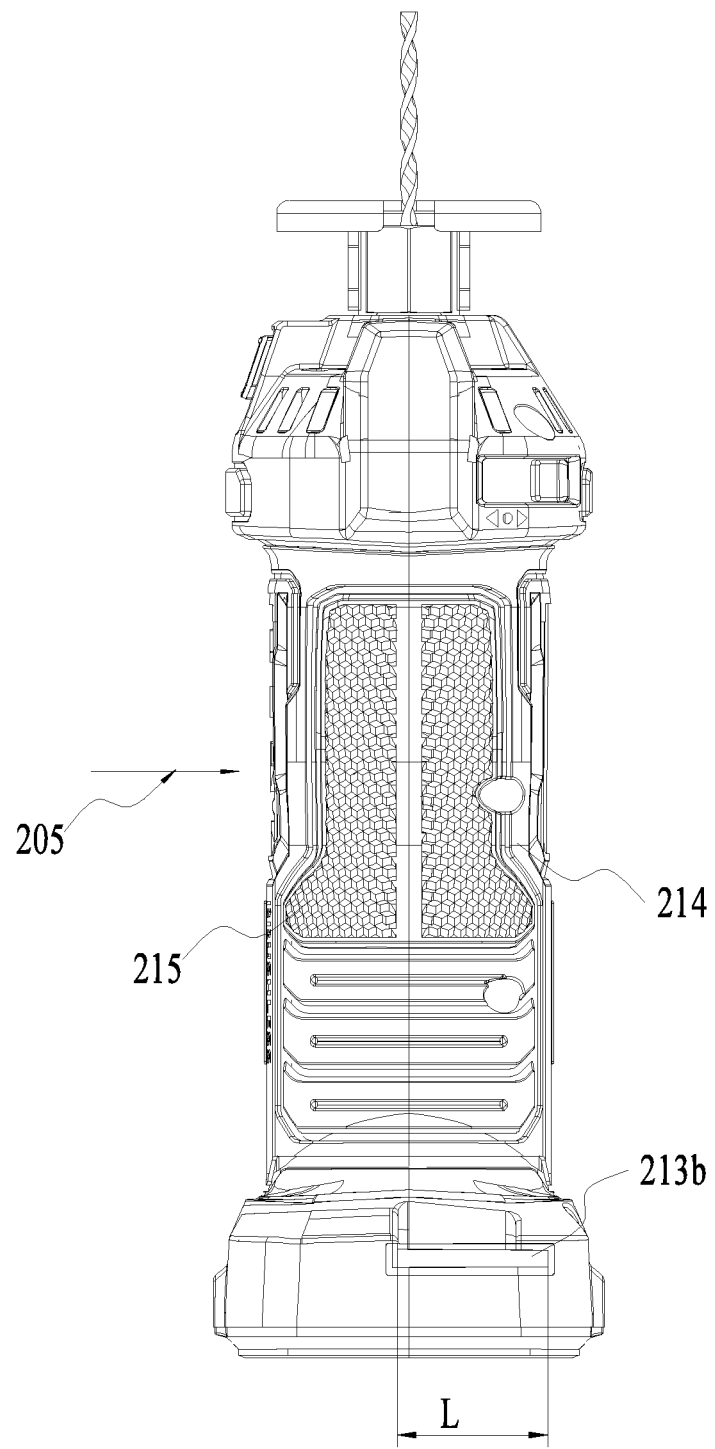
FIG. 15 is a plan view of the main body of FIG. 7.

As shown in FIGS. 14-15, the mounting groove 213a has a notch 213b, and the notch 213b allows the operating member 400 to be inserted into the mounting groove 213a. A stopping portion 241 is formed on the battery pack 24. The stopping portion 241 is used to limit the position when the battery pack 24 is coupled to the housing 21, and the stopping portion 241 protrudes upward. The notch 213b and the stopping portion 241 are respectively located on both sides of the coupling portion 212, so that the stopping portion 241 will not block the notch 213b. Therefore, the user can easily insert and remove the operating member 400 even when the battery pack 24 is mounted on the housing 21.

The dimension of the mounting groove 213a in the fourth line 205 is L. In the fourth line 205, the size of 0.7 L of the mounting groove 213a is located in the first housing portion 214, so that most of the mounting groove 213a is provided on the first housing portion 214, thereby facilitating the arrangement of the wire 27. Further, most of the region of the notch 213b is also provided on the first housing portion 214. As described above, the first housing portion 214 and the second housing portion 215 are symmetrical with respect to the above-described third plane, and the area of the region where the mounting groove 213a is provided on the first side of the third plane is larger than the area of the region where the mounting groove 213a is provided on the second side of the third plane. That is to say, the mounting groove 213a is not symmetrically provided on both sides of the third plane, and in fact, most of the region of the mounting groove 213a is provided on one side of the third plane.

Figure 16:
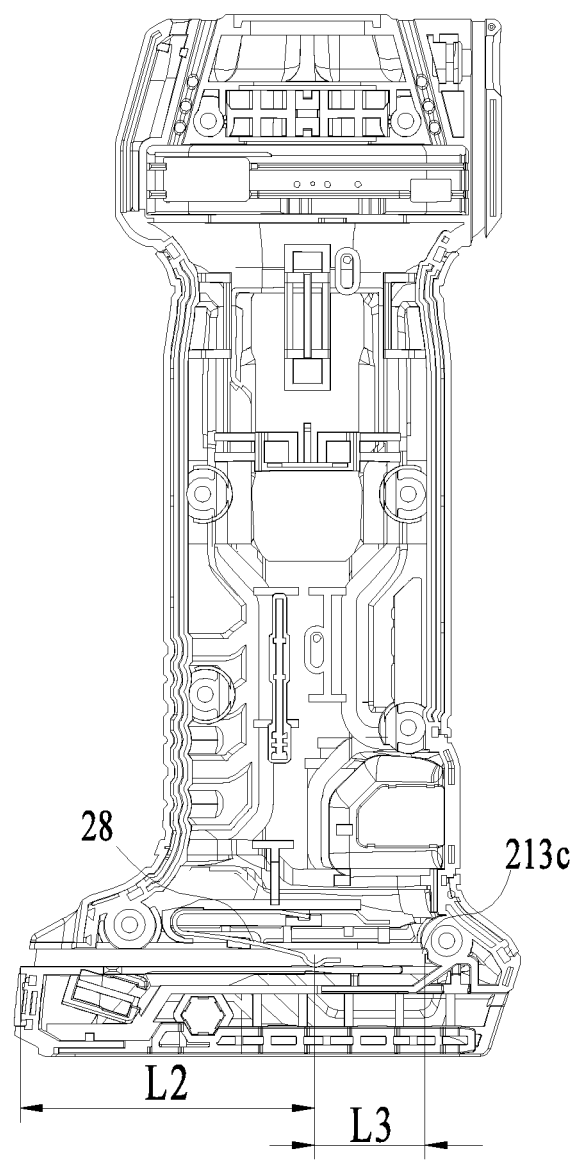
FIG. 16 is a plan view of a first housing portion and a limiting member of the main body of FIG. 13.
Figure 17:
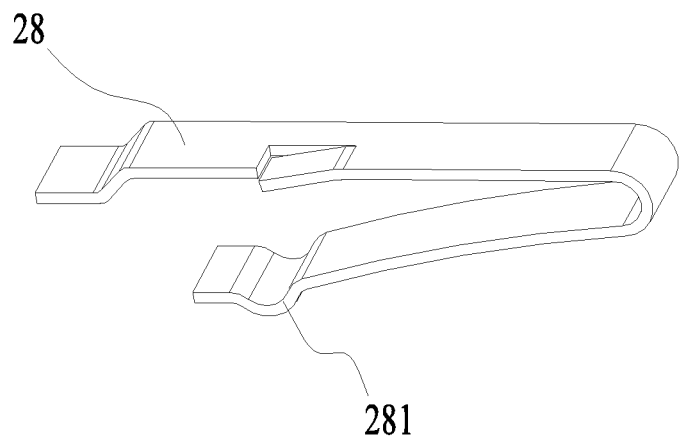
FIG. 17 is a perspective view of the limiting member of FIG. 16.
Figure 18:
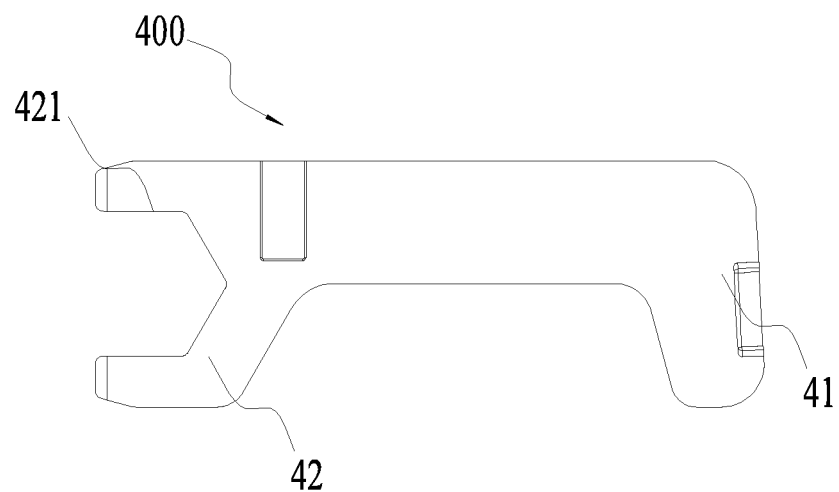
FIG. 18 is a perspective view of the operating member of FIG. 8.

As shown in FIGS. 16-18, the mounting groove 213a has a groove bottom 213c, and the groove bottom 213c is disposed opposite to the notch 213b. A limiting member 28 is also provided in the mounting groove 213a, and the limiting member 28 is an elastic member. When the operating member 400 is inserted into the mounting groove 213a along the first line 202, the limiting member 28 restricts the operating member 400 to prevent the limiting member 28 from deviating from the first direction, and it can also prevent the operating member 400 from disengaging from the mounting groove 213a without the user's force. A contacting portion 281 is formed on the limiting member 28, the contacting portion 281 is used to contact the operating member 400, and the contacting portion 281 restricts the operating member 400 from leaving the mounting groove 213a when receiving a force smaller than a preset value. Wherein, the ratio of a distance L2 from the contacting portion 281 to the notch 213b to a distance L3 from the contacting portion 281 to the groove bottom 213c is greater than or equal to 1.5 and less than or equal to 5. Further, the ratio of the distance L2 from the contacting portion 281 to the notch 213b to the distance L3 from the contacting portion 281 to the groove bottom 213c is greater than or equal to 2 and less than or equal to 3.5. In this way, when the operating member 400 is inserted into the mounting groove 213a from the notch 213b and a large part of the operating member 400 enters the mounting groove 213a, the operating member 400 will come into contact with the contacting portion 281. In this way, the user can insert the operating member 400 into the mounting groove 213a with less effort. When the user disassembles the operating member 400, as long as the operating member 400 is pulled out a little by the user, the operating member 400 will no longer be affected by the limiting member 28, so that the user can remove the operating member 400 with less effort.

The operating member 400 includes an operating portion 41 and a driving portion 42. The operating portion 41 is used for the user to operate, and the driving portion 42 is used to drive the locking member 251 to switch between the locked state and the released state. In this example, the driving portion 42 is formed with a driving structure 421 for cooperating with the locking member 251, the driving structure 421 is symmetrically arranged about a straight line, and the operating portion 41 is symmetrically about the straight line. In this way, the operating member 400 can be adapted to the structure of the mounting groove 213a. When the operating member 400 is inserted into the mounting groove 213a, most of the operating member 400 is disposed on the first housing portion 214.

What is claimed is:

1. An electric tool, comprising:
    a housing provided with a first air outlet and a second air outlet;
    a motor arranged in the housing;
    a power output assembly connected to the motor; and
    a switching member capable of rotating in the housing, wherein the switching member is provided with a third air outlet and a fourth air outlet,
    wherein the switching member is capable of rotating to a first position and a second position in the housing;
    when the switching member rotates to the first position, the first air outlet is in communication with the third air outlet and the fourth air outlet is closed by the housing; and, when the switching member rotates to the second position, the second air outlet is in communication with the fourth air outlet and the third air outlet is closed by the housing, and
    wherein the switching member is disposed in the housing and is provided with a through hole for a rotor of the motor to pass through, the switching member is provided with an operating structure for a user to operate to drive the switching member to rotate, and the housing is provided with a hole for the operating structure to pass through.

2. The electric tool of claim 1, wherein the first air outlet is arranged at an upper end of the housing and the second air outlet is arranged on a side surface of the housing.

3. The electric tool of claim 1, wherein the switching member comprises an upper wall and a side wall, the third air outlet is arranged on the upper wall of the switching member, and the fourth air outlet is arranged on the side wall of the switching member.

4. The electric tool of claim 3, wherein the housing is provided with a mounting groove for mounting the switching member, the mounting groove comprises an upper side wall, a lower side wall and a bottom wall, the upper side wall contacts with the upper wall of the switching member, the lower side wall abuts against a lower end of the switching member.

5. The electric tool of claim 4, wherein the bottom wall of the mounting groove is provided with flanges and the flanges abut against the side wall of the switching member.

6. The electric tool of claim 5, wherein the number of the flanges is two and the two flanges lock an airflow from the fourth air outlet in an air duct formed between the two flanges.

7. The electric tool of claim 1, wherein the operating structure is a rib integrally formed on the switching member, the hole is a slot-shaped hole for the rib to pass through, the slot-shaped hole extends along a circumferential direction of the housing, and the rib is capable of sliding in the slot-shaped hole along the circumferential direction of the housing.

8. The electric tool of claim 1, wherein the electric tool further comprises a guard, the housing comprises a mounting rib for mounting the guard, and the mounting rib is provided with the first air outlet.

9. The electric tool of claim 1, wherein the motor comprises a motor shaft rotatable about a first axis and the first air outlet extends along a direction obliquely intersecting the first axis.

10. The electric tool of claim 1, wherein the switching member is arranged at an upper end of the motor.

11. The electric tool of claim 1, wherein, when the switching member rotates to the first position, the second air outlet is closed by the switching member and, when the switching member rotates to the second position, the first air outlet is closed by the switching member.

12. An electric tool, comprising:
    a housing provided with a first air outlet and a second air outlet;
    a motor arranged in the housing;
    a power output assembly connected to the motor; and
    a switching member capable of rotating to a first position and a second position relative to the housing,
    wherein, when the switching member rotates to the first position, the first air outlet guides an airflow to blow to the outside of the housing, and the second air outlet is closed by the switching member and, when the switching member rotates to the second position, the second air outlet guides the airflow to blow to the outside of the housing and the first air outlet is closed, and wherein the switching member is disposed in the housing and is provided with a through hole for a rotor of the motor to pass through.

13. A drywall cutting tool, comprising:
a housing provided with a first air outlet and a second air outlet;
a motor arranged in the housing;
a power output assembly connected to the motor; and
a switching member capable of rotating to a first position and a second position relative to the housing,
wherein, when the switching member rotates to the first position, the first air outlet guides an airflow to blow to the outside of the housing and the second air outlet is closed by the switching member and, when the switching member rotates to the second position, the second air outlet guides the airflow to blow to the outside of the housing and the first air outlet is closed, and
wherein the switching member is disposed in the housing and is provided with a through hole for a rotor of the motor to pass through.

14. The drywall cutting tool of claim 13, wherein the switching member is provided with a third air outlet and a fourth air outlet; when the switching member rotates to the first position, the first air outlet is in communication with the third air outlet and the fourth air outlet is closed by the housing; and, when the switching member rotates to the second position, the second air outlet is in communication with the fourth air outlet and the third air outlet is closed by the housing.

15. The drywall cutting tool of claim 14, wherein the switching member comprises an upper wall and a side wall, the third air outlet is provided on the upper wall of the switching member, and the fourth air outlet is provided on the side wall of the switching member.

16. The drywall cutting tool of claim 14, wherein the switching member is arranged at an upper end of the motor.

17. The drywall cutting tool of claim 13, wherein the first air outlet is arranged at an upper end of the housing and the second air outlet is arranged on a side surface of the housing.

18. The drywall cutting tool of claim 13, wherein first air outlet guides an airflow to a working area on an upper side of the drywall cutting tool and the second air outlet guides the airflow to the side of the drywall cutting tool.

* * * * *